United States Patent
Rinne et al.

(10) Patent No.: US 6,801,770 B2
(45) Date of Patent: Oct. 5, 2004

(54) SIGNALLING METHOD AND TELECOMMUNICATION SYSTEM

(75) Inventors: Mikko Rinne, Helsinki (FI); Kalle Ahmavaara, Helsinki (FI)

(73) Assignee: Nokia Networks Oy, Espoo (FI)

( * ) Notice: Subject to any disclaimer, the term of this patent is extended or adjusted under 35 U.S.C. 154(b) by 493 days.

(21) Appl. No.: 09/882,299

(22) Filed: Jun. 18, 2001

(65) Prior Publication Data

US 2002/0002050 A1 Jan. 3, 2002

Related U.S. Application Data

(63) Continuation of application No. PCT/FI99/01064, filed on Dec. 21, 1999.

(30) Foreign Application Priority Data

Dec. 22, 1998 (FI) .................................................. 982781

(51) Int. Cl.$^7$ ............................................... H04Q 7/20
(52) U.S. Cl. ........................ 455/434; 455/403; 455/450; 320/349
(58) Field of Search ............................. 455/434, 435.2, 455/403, 422.1, 466, 452.1, 432.2, 450; 370/294, 349, 431, 435, 321, 337, 347, 442

(56) References Cited

U.S. PATENT DOCUMENTS

| | | | |
|---|---|---|---|
| 4,980,767 A | | 12/1990 | Chao et al. |
| 5,499,246 A | * | 3/1996 | Cooper ........................ 370/345 |
| 5,561,468 A | * | 10/1996 | Bryan et al. ................. 348/469 |
| 5,905,733 A | * | 5/1999 | Solve et al. ................. 370/522 |
| 6,337,855 B1 | * | 1/2002 | Malkamaki .................. 370/347 |
| 6,452,914 B2 | * | 9/2002 | Niemela ...................... 370/337 |
| 6,456,627 B1 | * | 9/2002 | Frodigh et al. ............. 370/465 |
| 6,463,107 B1 | * | 10/2002 | Lindoff et al. .............. 375/343 |
| 6,477,176 B1 | * | 11/2002 | Hamalainen et al. ....... 370/435 |
| 6,522,644 B2 | * | 2/2003 | Bergkvist .................... 370/350 |
| 6,563,884 B1 | * | 5/2003 | Nikula ......................... 375/295 |
| 6,631,274 B1 | * | 10/2003 | Keshavachar ............... 455/466 |

FOREIGN PATENT DOCUMENTS

| | | |
|---|---|---|
| WO | WO 98/07291 | 2/1998 |
| WO | WO 98/25356 | 6/1998 |

OTHER PUBLICATIONS

Silventoinen et al., "Fast Power Control for GSM HBS Using Training Sequences," IEEE 47th Vehicular Technology Conference, 1997, vol. 3, pp. 1689–1693.

\* cited by examiner

*Primary Examiner*—Sonny Trinh
(74) *Attorney, Agent, or Firm*—Pillsbury Winthrop LLP

(57) ABSTRACT

A signalling method in a wireless digital telecommunication system between a base station and a terminal, where the signals between the base station and the terminal are generated from bursts comprising symbols, the bursts comprising a known training sequence. The symbols are used for generating a second training sequence of the same length as the known training sequence and a burst comprising said training sequence to be used for transmitting signalling messages. The number of training sequences used can be restricted to two, whereby conventional user data is sent in the burst comprising the known training sequence and information deviating from the conventional user data is sent by the burst comprising the second training sequence, and the stealing symbols in the burst can be used for specifying a signalling message to be transmitted.

14 Claims, 3 Drawing Sheets

| T | DS | S | TS | S | DS | T | G |

| T | UD | S | TS1 | S | UD | T | G |

| T | CD/UD | S | TS2 | S | CD/UD | T | G |

| T | UD | 0 | TS2 | 0 | UD | T | G |

| T | CD | 0 | TS2 | 1 | CD/UD | T | G |

SIGNALLING METHOD AND TELECOMMUNICATION SYSTEM

This application is a Continuation of International Application PCT/FI99/01064, filed on Dec. 21, 1999, which designates the U.S. and was published under PCT Article 21(2) in English.

FIELD OF THE INVENTION

The invention relates to a signalling method in a wireless digital telecommunication system and to a wireless digital telecommunication system.

BACKGROUND OF THE INVENTION

In digital radio systems, call-related signalling between a base station and a terminal occurs simultaneously with a call to be transferred on a traffic channel. The GSM system, for example, employs two signalling channels for conducting call-related signalling, a SACCH (Slow Associated Control Channel) and a FACCH (Fast Associated Control Channel). The SACCH is a separate low-rate signalling channel associated with each traffic channel. Due to its low rate the channel can be used for non-urgent signalling only. The FACCH is fast signalling within the traffic channel, and can be used for time-critical signalling. However, a part of the traffic channel capacity is then lost.

In digital radio systems, such as the GSM system, data transmission occurs in bursts, and a specific burst structure is determined for each purpose, like data and signalling transmission, synchronization or equalization. A normal burst used for data and signalling transmission comprises in the middle a training sequence including a set of predetermined symbols that the receiver identifies. When comparing the received training sequence with a known training sequence the receiver may create information on the distortion that an un-ideal radio path causes to the received signal. On the basis of this information the receiver can demodulate the received signal more efficiently. The applicant's previous patent application PCT/FI97/00465 describes a signalling method, in which a training sequence is used for signalling, that speeds up the signalling and leaves the entire traffic channel to be used by the payload.

The problem with the above system is the number of different training sequences required for transmitting versatile signals. One training sequence can describe one signalling message only, and if, for example, power control signalling including eight steps is to be performed, eight different training sequences are required. If the aim is to perform several signalling events with the above method, the number of training sequences easily increases significantly. This increases the receiver load and complicates the implementation of the receiver, since the received training sequence must be separately compared with each known training sequence. Particularly distinguishing training sequences from one another becomes more difficult when the reception conditions are poor. Furthermore, when higher data transmission rates are aimed at, the use of a training sequence no longer necessarily guarantees fast enough signalling owing to the above and since the duration of the training sequence is relatively long bearing in mind that the training sequence is capable of transmitting one message only. Due to these drawbacks said method has not been widely employed and the GSM system, for example, still uses signalling channels.

A significant drawback with prior art signalling is that it matches poorly with packet-switched data transmission. In present packet-switched wireless telecommunication systems, such as the GPRS system (General Packet Radio Service) designed on the basis of the GSM system, data transmission from a terminal to a base station (uplink) and vice versa (downlink) takes place irrespective of one another. In said systems a channel is formed between the terminal and the base station only, when either party has data packets to send. In other words, there is no need to maintain a continuous return channel for transmitting signalling or acknowledgement messages in said systems. To utilize such asymmetrical data transmission optimally would require transmission of signalling and acknowledgement messages when the channel capacity is used for other purposes as well.

SUMMARY OF THE INVENTION

The object of the invention is thus to provide an improved method and an apparatus implementing the method to avoid the above problems. The objects of the invention are achieved by a method and a system, which are characterized in what is said in the independent claims. The preferred embodiments of the invention are disclosed in the dependent claims.

The invention is based on the idea that various training sequences are used in the burst structure to indicate the contents of the burst. The recipient then interprets the received burst on the basis of the training sequence. A particular training sequence can preferably be employed in the burst structure to indicate that signalling data in particular is transmitted using the burst. The type of the signalling data to be transmitted can also be indicated in more detail by means of the stealing symbols in the burst. Stealing symbols have typically been used in a normal burst to indicate whether the data bits in a burst are allocated to be used on a traffic channel or stolen to be used on the FACCH. However, in the method of the invention the stealing symbols in the normal burst to be utilized for transmitting user data can also be allocated to transmit user data.

The method and system of the invention provide an advantage that enables transmission of signalling and acknowledgement messages particularly when the channel between the terminal and the base station is also employed for transferring user data. This is particularly advantageous in packet-switched wireless data transmission, as in this case the channel between the terminal and the base station does not have to be separately opened for signalling. Another advantage of the invention is that the data transmission capacity of a normal burst to be used for transmitting user data is not used for the signalling of the invention. A further advantage of the invention is that it alleviates the implementation of the detection in the receiver, as the received training sequence is compared with the two known training sequences only, thus reducing the receiver load. Still another advantage of the invention is that the data transmission capacity of a normal burst increases, since the stealing symbols in the normal burst can also be utilized for transmitting user data.

BRIEF DESCRIPTION OF THE DRAWINGS

In the following the invention will be described in greater detail in connection with the preferred embodiments, with reference to the accompanying drawings, in which FIG. 1 schematically shows a normal burst according to the GSM system.

DETAILED DESCRIPTION OF THE INVENTION

In the following the invention will be described by way of example on the basis of a TDMA-based (Time Division Multiple Access) GSM system and the further improvement thereof. It is obvious for those skilled in the art that the invention can be used in any corresponding telecommunication system.

Figures 1, 2, 3A, 3B:
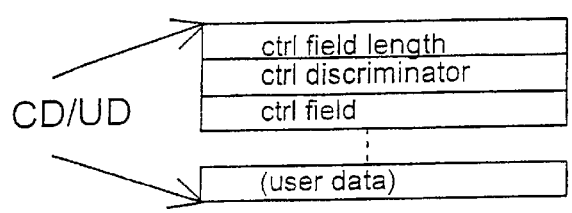
FIG. 2 schematically shows a known normal burst and a burst according to a preferred embodiment of the invention.
FIG. 3a shows a burst structure according to a preferred embodiment of the invention.
FIG. 3b shows a burst structure according to a second preferred embodiment of the invention.

FIG. 1 shows the structure of a normal burst according to the GSM system, the length of the normal burst being 156,25 and the duration 0,577 ms. The normal burst comprises one time slot of a TDMA frame which comprises eight time slots all together. The normal burst comprises in the middle a training sequence (TS) that includes 26 symbols and that is used for correcting the received signal as described above. Stealing symbols (S), which are one symbol in length and located on both sides of the training sequence TS, are used for indicating the possible use of even and/or odd data symbols (DS) for FACCH signalling. The data symbols DS intended to transfer user and signalling data are divided into two sequences of 57 symbols which are located before the first stealing symbol and after the second stealing symbol. Tail symbol sequences (T), which are three symbols in length, are located at the beginning and in the end of a burst, and within the duration of the tail symbols the transmitter is correspondingly switched on and off between the bursts. After the burst, there is a guard period (G) of 8,25 symbols that prevents adjacent time slots from overlapping in base station reception.

According to a preferred embodiment of the invention a new burst type is introduced that deviates from the burst structure described above only in that the training sequence of the burst is different. Here the known training sequence in a normal burst is referred to as TS1 and the training sequence of the invention is referred to as TS2 in accordance with FIG. 2. According to a preferred embodiment of the invention the burst according to the invention is employed in particular for transmitting control data (CD), whereby the known normal burst can, if necessary, be allocated to transfer user data (UD) only. User data can also be transmitted using the burst of the invention in situations where the transfer of user data also requires exceptional signalling. Then, in the reception the type of information in the burst can be deduced on the basis of the training sequence. Particularly when a burst comprising the training sequence TS2 is received, the receiver knows that the burst may comprise specific signalling data.

According to another preferred embodiment of the invention the number of various training sequences is restricted to said two training sequences TS1 and TS2. This alleviates the implementation of the detection in the receiver, as the received training sequence is compared with the two known training sequences only, thus reducing the receiver load. Particularly distinguishing training sequences from one another becomes easier in poor reception conditions compared with prior art, since the symbol constellations of the two training sequences can easily be determined to differ greatly from one another, and a large number of symbol errors in the received training sequences cannot either prevent the detection of the training sequence.

According to a preferred embodiment of the invention the stealing symbols in the burst of the invention are used to specify the information in the burst. Then, the stealing symbols of the known normal burst can also, if needed, be utilized when transferring user data. The use of the stealing symbols of the invention is explained in the following in greater detail with reference to the examples in FIGS. 3a–3d. In order to simplify the description, it is assumed in the following examples that the stealing symbols of the burst structure both comprise one bit. The invention can naturally also be implemented in systems where several bits are modulated into one symbol, in which case the amount of information to be specified using the stealing symbols is multiplied.

FIG. 3a shows the burst structure of the invention, where the data symbols DS are allocated to the user data UD, the training sequence is the training sequence TS2 of the invention and both the stealing symbols are 0-bits. On the basis of the indicated training sequence TS2 the receiver knows that the burst comprises some signalling data and checks the specified information indicated by the stealing symbols. This burst may indicate, for example, the last time slot from the user data flow to be transferred on a particular channel. The transmission of a specific end sign is thus avoided in an additional burst.

FIG. 3b describes the burst structure of the invention intended for fast signalling in particular. In this burst the data symbols DS are entirely or partly allocated to the signalling data, the training sequence is the training sequence TS2 of the invention and the first of the stealing symbols is preferably a 0-bit and the second a 1-bit. The spreading figure shown in FIG. 3b describes in greater detail the signalling and user data fields CD/UD in the data symbols DS. There is a field in the beginning of the data symbols determining the field length of the signalling data (ctrl field length). A signalling discriminator (ctrl discriminator) defines the signalling message in question which is added after the signalling discriminator. Several signalling messages (ctrl field) can preferably also be transferred in the same burst. When the receiver knows, on the basis of the signalling discriminator, which signalling fields are concerned, it can distinguish the transmitted messages from the burst. If all messages to be transmitted and the lengths thereof are predetermined, i.e. standardized messages are concerned, then the field determining the total length of the signalling data is not needed, as the receiver is aware of the length of the messages. However, it is preferable to keep the field determining the total length of the signalling data as an optional alternative and thereby alleviate the introduction of new signalling messages. If all data symbols are not needed for the signalling message, the unused symbols can be employed for transmitting user data. The burst according to FIG. 3b can preferably be used to replace the FACCH signalling according to the GSM system.

Figure 3C:
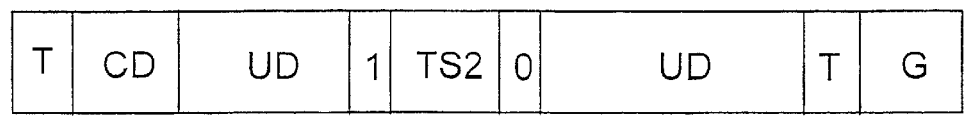
FIG. 3c shows a burst structure according to a third preferred embodiment of the invention.

FIG. 3c describes the burst structure of the invention intended for slow signalling in particular, that is for replacing the SACCH signalling according to the GSM system, for example. A field of a specific length is allocated in the beginning of the data symbol field to the signalling data CD, and the rest of the data symbols can be employed for transmitting user data UD. The training sequence is the training sequence TS2 of the invention and the first of the stealing symbols is preferably a 1-bit and the second a 0-bit. This burst structure provides the advantage that if a known short signalling message is to be transmitted in one burst or if a longer, non-urgent signalling message is interleaved into several bursts, it is not necessary to attach the field determining the total length of the signalling data to the signalling data field.

Figure 3D:
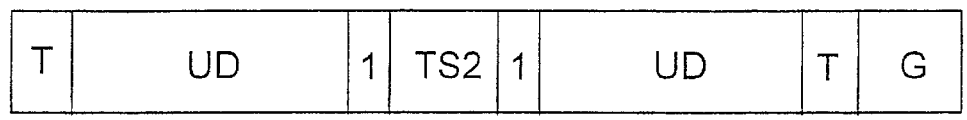
FIG. 3d shows a burst structure according to a fourth preferred embodiment of the invention.

FIG. 3d describes the burst structure of the invention that can be used in applications that enable restricted retransmission of a burst. Such cases include real time speech or video image transmission, in which a sensible use of the application enables retransmission of a burst that is poorly received in the following TDMA frame only. In the burst the data symbols DS are allocated to the user data UD, the training sequence is the training sequence TS2 of the invention and both stealing symbols are 1-bits. Said burst can be employed in situations where the received normal burst is of poor quality and it is requested to be resent in the following time slot allocated to the channel. If the transmitter is able to receive the retransmission request in time, the data symbols of the previous burst are sent in the burst according to FIG. 3d. Then, on the basis of the training sequence TS2 and the 1-bit stealing symbols the receiver can deduce that retransmission is concerned. If stealing symbols have been used for transmitting user data in the original normal burst, these have to be punctured before connecting the original burst to the retransmitted burst and attached to the original position in the burst structure when connecting the bursts. If the transmitter cannot receive a retransmission request, then the bursts are continued to be normally transmitted.

The burst of the invention can therefore, if needed, also be used for transmitting user data. However, the training sequence TS2 in the burst indicates that the information in the burst is somehow exceptional as regards the normal burst.

Figure 4:
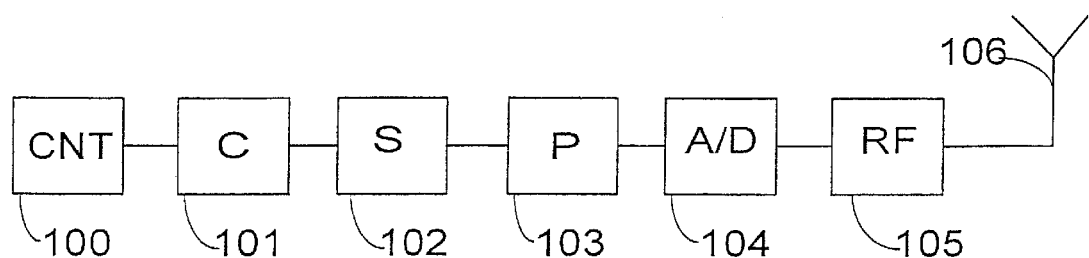
FIG. 4 is a block diagram showing a transmitter according to a preferred embodiment of the invention.

The following describes the essential parts of the transmitter in the telecommunication system of the invention by means of the block diagram in FIG. 4. The transmitter comprises means 100 that include the information to be sent, for example, the information about the last burst in the data flow according to FIG. 3a. This information is coded in accordance with the invention into a combination of a determined training sequence and a stealing symbol combination in coding means 101, from where the coded information is applied to means 102 to be connected with the signal to be transmitted and the stealing symbols thereof. Next, the signal is modulated by processing means 103 and applied to conversion means 104 where the signal is converted from digital to analogue mode. The analogue signal is transferred to radio frequency parts 105 where the signal is converted to the transmission frequency. Then the signal is sent by an antenna 106 through the radio path to the receiver.

Figure 5:
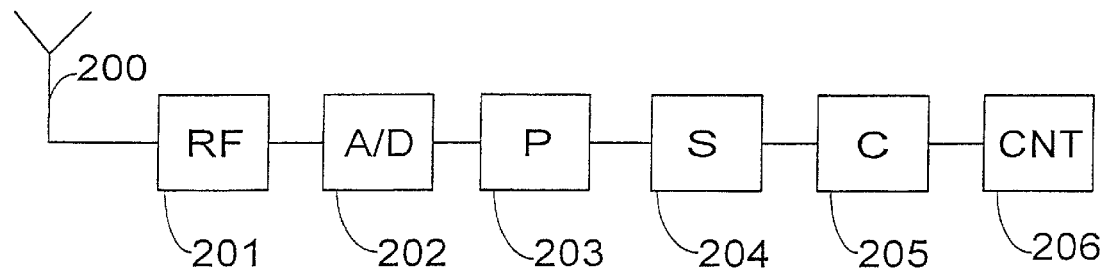
FIG. 5 is a block diagram showing a receiver according to a preferred embodiment of the invention.

The essential parts of the receiver in the telecommunication system of the invention are described in the block diagram according to FIG. 5. The receiver comprises an antenna 200 for receiving the signal sent through the radio path and wherefrom the signal is applied to radio frequency parts 201 in which the signal is converted to an intermediate frequency. The signal is then transferred to conversion means 202 where the signal is reconverted from analogue to digital mode. The digital signal propagates to processing means 203 where the signal may be filtered and demodulated, the channel impulse response and the energy thereof can be estimated, and the signal distorted on the channel can be restored into its original form. The restored signal is applied to separation means 204 where the identified training sequence and the stealing symbols are separated from the signal. Decoding means 205 decode the received training sequence and the stealing symbols in accordance with the method presented in the invention, and means 206 start the operations according to the preferred embodiments that correspond with the message in the transmitted signalling data.

The above operations in the transmitter and the receiver can be implemented, for example, using general or signal processors or separate logic. To implement single operations is known for those skilled in the art and the description thereof is not needed in this context.

In the following the application of the invention is explained in greater detail by means of an example describing on-demand adjustment of a parameter to be performed in packet-switched wireless data transmission. Such an adjustment is based on the idea that only those parameters are adjusted that need to be adjusted at a particular time, in which case a separate signalling channel, for example, does not have to be maintained for this purpose.

The uplink and downlink data transmission can be totally independent of one another in packet-switched wireless data transmission. In short-delay real time data transmission, the uplink and downlink traffic channels are maintained only for the time the data packets are sent in either direction. Sending signalling messages and acknowledgement messages becomes more difficult in the opposite direction, as a continuously maintained channel for this purpose does not exist. It is therefore preferable if any maintained channel can be used for transmitting acknowledgement messages. The terminal may simultaneously comprise several active data transmission connections which are determined and restricted in different ways. A terminal may for instance comprise, in addition to a normal telephone connection, a simultaneous packet-switched connection with an outside telephone number service. Then, the signalling between the terminal and the network or the acknowledgement thereof can be selected to be performed through the best available data transmission connection. If, for example, the counterpart speaks on the telephone connection of the terminal, when the uplink speech connection of the terminal is not in use, the signalling messages can be multiplexed to said packet-switched data connection. If, in turn, the downlink signalling takes place through an active call connection and the call is disconnected midst signalling, then the signalling can be transferred to a possible data connection. If no data connections exist, the downlink signalling can preferably be arranged as a broadcast message to all terminals within the cell area. Naturally only the terminals for whom the message is indicated tend to operate as the message requires. However, in this way the frequency band is used more efficiently as compared with opening a separate channel for signalling.

Figure 6:
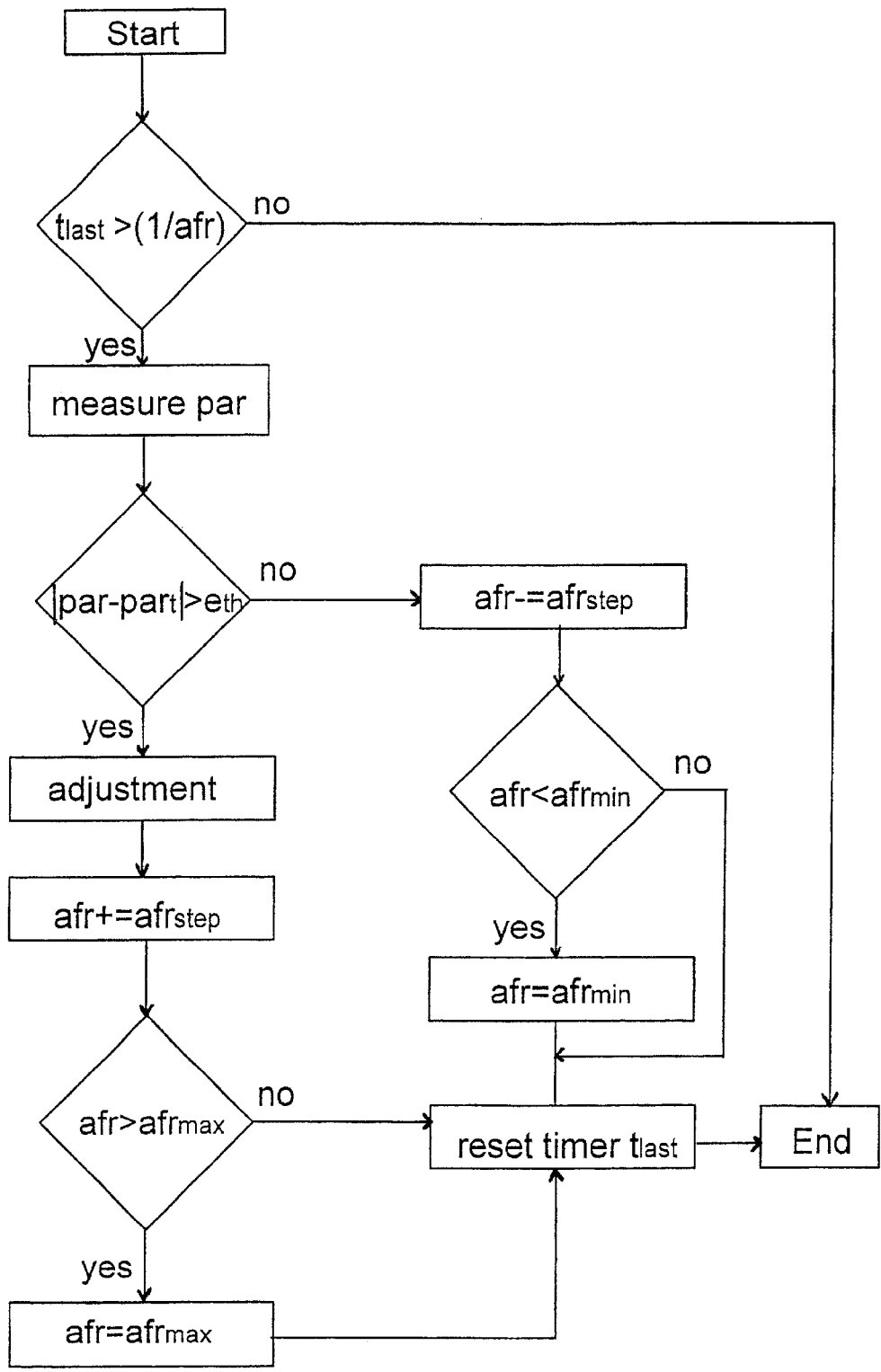
FIG. 6 is a flow chart showing parameter adjustment according to a preferred embodiment of the invention.

FIG. 6 is a flow chart describing the on-demand adjustment of an adaptive parameter where the signalling of the invention can be utilized. The adjustable parameter concerned can, for example, be the transmission power of a terminal. The adjustment process is started by checking if the time $t_{last}$ that has elapsed from the previous adjustment is sufficient for providing a new adjustment which is determined on the basis of the adjustment frequency afr. Next a parameter value par is measured and the value is compared with the optimal value part of the parameter. If the difference between the parameter value par and the optimal value $par_t$ of the parameter exceeds the error threshold $e_{th}$, then the parameter is adjusted and the value of the adjustment frequency afr is increased by a predetermined change $afr_{step}$. If the error threshold is not exceeded, the parameter does not need to be adjusted either, but the value of the adjustment frequency afr is reduced by a predetermined change $afr_{step}$. In both cases it is confirmed that the value of the adjustment frequency afr remain between the predetermined maximum value $afr_{max}$ and minimum value $afr_{min}$.

Even though the invention has above been described by way of example in connection with power control signalling, the invention is not restricted thereto but the signalling of the invention can be used for any similar purposes, particularly in packet-switched data transmission. One example is the change of the used coding method in connection with link adaptation. However, it should be noted that digital wireless telecommunication systems, particularly TDMA systems, also comprise other types of bursts than the normal burst described in this context and the embodiment of the invention thereof. The burst structure of the invention cannot necessarily be used for sending the signalling data transmitted by these bursts.

Furthermore, even though the invention has above been described by way of example according to the preferred embodiment of the invention in which two training sequences are used, the number of training sequences is not restricted to two, but the invention can also be implemented using several training sequences. Then, the implementation of the receiver becomes more complicated, but the number of signalling messages to be indicated increases when the possible combinations of training sequences and stealing symbols increase.

It is obvious for those skilled in the art that as technology progresses the basic idea of the invention can be implemented in a number of ways. The invention and the embodiments thereof are thus not restricted to the above examples but may vary within the scope of the claims.

What is claimed is:

1. A signalling method in a wireless digital telecommunication system between a base station and a terminal, the method comprising steps of
generating the signals between the base station and the terminal from bursts comprising symbols, the bursts comprising a known training sequence,
generating from symbols a second training sequence of the same length as the known training sequence,
generating a burst comprising said second training sequence,
using the burst comprising said second training sequence for transmitting at least one signalling message, and
using stealing symbols in the burst comprising said second training sequence for specifying the signalling message to be transmitted.

2. A method as claimed in claim 1, further comprising indicating the existence of said signalling message, in response to the received burst comprising said second training sequence.

3. A method as claimed in claim 2, further comprising restricting the number of the training sequences to be used to two.

4. A method as claimed in claim 3, further comprising
sending user data in the burst comprising said known training sequence and
sending in the burst comprising said second training sequence at least one of the following: signalling data, user data.

5. A method as claimed in claim 1, wherein the burst comprising said second training sequence is used for transmitting FACCH signalling according to the GSM system.

6. A method as claimed in claim 1, wherein the burst comprising said second training sequence is used for transmitting SACCH signalling according to the GSM system.

7. A method as claimed in claim 1, wherein the method is used in a packet-switched wireless telecommunication system.

8. A method as claimed in claim 1, wherein the method is used for adjusting the transmission power of the mobile station and the base station.

9. A method as claimed in claim 1, wherein the method is used for determining the used coding method.

10. A wireless digital telecommunication system for signalling between a base station and a terminal, where the signals to be transmitted over a radio connection between the base station and the terminal comprise bursts generated from symbols, the bursts comprising a known training sequence, the system comprising at least one transmitter and at least one receiver, whereof
the transmitter comprises means for generating said training sequence, means for generating a second training sequence of the same length as the known training sequence and means for generating a burst comprising said second training sequence and for coding a signalling message into said burst and
the receiver comprises means for identifying said training sequence, means for receiving the burst comprising said second training sequence, means for identifying said second training sequence and means for decoding the coded signalling message in said burst,
wherein at least one stealing symbol in the burst comprising said second training sequence is arranged to specify the contents in the signalling message to be transmitted.

11. A telecommunication system as claimed in claim 10, wherein the receiver is arranged to indicate the existence of said signalling message, in response to the received burst comprising said second training sequence.

12. A telecommunication system as claimed in claim 11, wherein the number of the training sequences to be used in the system is restricted to two.

13. A telecommunication system as claimed in claim 12, wherein
said burst comprising the known training sequence is arranged to transmit user data and
said burst comprising the second training sequence is arranged to transmit at least one of the following: signalling data, user data.

14. A telecommunication system as claimed in claim 10, wherein said burst comprising the second training sequence is arranged to define the coding method to be used.

* * * * *